United States Patent
Isobe et al.

(10) Patent No.: US 6,684,154 B2
(45) Date of Patent: Jan. 27, 2004

(54) FAILURE DETERMINATION APPARATUS AND METHOD AND ENGINE CONTROL UNIT FOR DETERMINING A FAILURE OF A TEMPERATURE SENSOR

(75) Inventors: Takashi Isobe, Saitama-ken (JP); Kojiro Tsutsumi, Saitama-ken (JP); Hideyuki Oki, Saitama-ken (JP); Yukio Miyashita, Saitama-ken (JP); Koichi Yoshiki, Saitama-ken (JP); Tetsuya Ohno, Saitama-ken (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 47 days.

(21) Appl. No.: 10/188,040

(22) Filed: Jul. 3, 2002

(65) Prior Publication Data

US 2003/0009276 A1 Jan. 9, 2003

(30) Foreign Application Priority Data

Jul. 5, 2001 (JP) ....................... 2001-204527

(51) Int. Cl.⁷ .................. G06F 19/00; G05B 23/00; F02D 45/00
(52) U.S. Cl. .................. 701/114; 701/113; 701/34; 702/99
(58) Field of Search ................ 701/114, 113, 701/102, 115, 29, 34, 35, 31; 702/99, 130, 183, 185

(56) References Cited

U.S. PATENT DOCUMENTS 4,556,029 A * 12/1985 Yamaguchi et al. ........ 123/491
4,949,078 A * 8/1990 Ito et al. .................... 701/34
5,848,381 A * 12/1998 Ishii et al. .................. 702/99
5,884,243 A * 3/1999 Taniguchi et al. .......... 702/183
6,362,599 B1 * 3/2002 Turner et al. ............... 320/135

FOREIGN PATENT DOCUMENTS

| JP | 6-81727 A | * 3/1994 | .......... F02M/25/08 |
| JP | 8-284624 | * 10/1996 | ............. F01L/3/24 |
| JP | 2003-20988 | * 1/2003 | ........... F02D/45/00 |

* cited by examiner

Primary Examiner—Hieu T. Vo
(74) Attorney, Agent, or Firm—Arent Fox Kintner Plotkin & Kahn

(57) ABSTRACT

There is provided a failure determination apparatus which is capable of determining the failure of a temperature sensor promptly and correctly regardless of environmental conditions at the start of an internal combustion engine. An ECU calculates an operation progress parameter indicative of a degree of progress of operation of the internal combustion engine from the start thereof. A RAM of the ECU stores a value of the temperature detected by the temperature sensor at a stoppage of the engine. Further, the ECU measures a stop time period from the stoppage to a start of the engine, and determines that the temperature sensor is faulty, when the difference between a value of the temperature detected by the temperature sensor at the start of the present operation of the engine and the value of the temperature stored in the RAM is equal to or smaller than a predetermined reference value on condition that the operation progress parameter calculated during the immediately preceding operation of the engine is larger than a predetermined value, and that the stop time period before the present operation of the engine is longer than a predetermined time period.

8 Claims, 2 Drawing Sheets

FAILURE DETERMINATION APPARATUS AND METHOD AND ENGINE CONTROL UNIT FOR DETERMINING A FAILURE OF A TEMPERATURE SENSOR

BACKGROUND OF THE INVENTION

1. Field of the Invention

This invention relates to a failure determination apparatus and method and an engine control unit for determining the failure of a temperature sensor that detects a temperature which changes according to an operating condition of an internal combustion engine.

2. Description of the Prior Art

Conventionally, a failure determination apparatus for a temperature sensor of the above-mentioned kind was proposed e.g. by Japanese Patent Publication (Kokoku) No. 3-56417. The failure determination apparatus determines the failure of a temperature sensor comprised of a thermistor, such as an intake air temperature sensor or an engine coolant temperature sensor, assuming that the output value of the temperature sensor decreases with an increase in temperature. The failure determination apparatus includes a control circuit connected to the temperature sensor, and the control circuit determines the failure of the temperature sensor based on the output value of the temperature sensor in the following manner: First, it is determined whether or not a first predetermined time period (e.g. 10 minutes) has elapsed after a start of an internal combustion engine. This is for allowing the engine to be warmed up to raise a temperature to be detected by the temperature sensor, thereby reducing the actual output value of the temperature sensor to a sufficiently reduced value. Then, when the first predetermined time period has elapsed after the start of the engine, the output value of the temperature sensor is compared with a predetermined reference value, and when a state of the output value of the temperature sensor being larger than the reference value has continued for a second predetermined time period or longer, it is determined that the temperature sensor is faulty. In short, according to the proposed failure determination apparatus, the temperature sensor is not determined to be faulty immediately after the temperature sensor has temporarily output a value exceeding the reference value, but only after the temperature sensor has continued to output larger values than the reference value over the second predetermined time period, it is determined that the temperature sensor is faulty since the output therefrom is fixed. The above determining process enables the failure determination apparatus to avoid erroneous determination of the failure of the temperature sensor which might be caused by a temporary error in output from the temperature sensor itself, or noises.

The above failure determination apparatus, however, takes a long time (first predetermined time period+second predetermined time period) from the start of the engine before it finally determines that the temperature sensor is faulty. For this reason, e.g. in determining the amount of fuel to be supplied to the engine at the start thereof depending on the temperature detected by the above temperature sensor, if the temperature sensor is faulty, the output from the temperature sensor can indicate a high temperature to be detected after completion of warming-up of the engine even during a cold start of the same. In this case, since the amount of fuel to be supplied to the engine is determined depending on the output from the faulty temperature sensor, the operation of the engine after the start becomes unstable due to insufficient supply of fuel, and it takes a long time before the engine is fully warmed up.

Further, in the above failure determination apparatus, the start of comparison between the output value of the temperature sensor and the reference value is determined only by reference to time elapsed after the start of the engine. This can bring about the following problems: When the engine is started in an extremely cold condition, or when idling operation continues thereafter, the engine is not sufficiently warmed up even after the lapse of the first predetermined time period from the engine start, so that the output value of the temperature sensor may not become lower than the reference value. In this case, if the state continues over the second predetermined time period, the temperature sensor is erroneously determined to be faulty even though it is not faulty, i.e. normally functioning.

SUMMARY OF THE INVENTION

It is an object of the invention to provide a failure determination apparatus and method and an engine control unit which are capable of determining the failure of a temperature sensor promptly and correctly, regardless of environmental conditions at the start of an internal combustion engine using the temperature sensor.

To attain the above object, according to a first aspect of the invention, there is provided a failure determination apparatus and method an engine control unit for determining failure of a temperature sensor that detects a temperature which changes according to an operating condition of an internal combustion engine.

The failure determination apparatus according to the first aspect of the invention is characterized by comprising:

operation progress parameter calculation means for calculating an operation progress parameter indicative of a degree of progress of operation of the engine after the engine has started;

temperature memory means for storing a value of the temperature detected by the temperature sensor when the engine is stopped;

stop time measurement means for measuring a stop time period from a stoppage to a start of the engine; and failure determination means for determining that the temperature sensor is faulty, when a difference between a value of the temperature detected by the temperature sensor at the start of the present operation of the engine and the value of the temperature stored in the temperature memory means is equal to or smaller than a predetermined reference value, on condition that the operation progress parameter calculated during an immediately preceding operation of the engine is larger than a predetermined value, and that the stop time period before the start of the present operation of the engine is longer than a predetermined time period.

According to this failure determination apparatus, when the internal combustion engine is started, a temperature which changes according to the operating condition of the engine is detected by the temperature sensor, and the operation progress parameter indicative of the degree of progress of the operation of the engine from the start thereof is calculated by the operation progress parameter calculation means. Then, when the operation of the engine is stopped, a value of the temperature detected at a stoppage of the engine is stored by the temperature memory means. Further, a stop time period from a time point of the stoppage of engine to a time point the engine is started again is measured by the stop time measurement means. As a result, when the difference between the value of the temperature detected by the temperature sensor at the start of the present operation of the engine and the value of the temperature stored in the temperature memory means is equal to or smaller than the predetermined reference value on condition that the operation progress parameter calculated during the immediately preceding operation of the engine is larger than the predetermined value, and that the stop time period before the present operation of the engine is longer than the predetermined time period, it is determined that the temperature sensor is faulty. In other words, if the temperature sensor is normal, a value of the temperature output from the temperature sensor at a stoppage of the engine after a full operation thereof should be sufficiently high, and further if a long stop time period has elapsed after the immediately preceding operation of the engine, a value of the temperature output from the temperature sensor at the start of the present operation should be sufficiently lower than the value of the temperature detected at the stoppage of the immediately preceding operation of the engine, which means the difference between the two temperature values is large. Therefore, since the difference between the two values of the temperature should be normally large, by determining that the temperature sensor is faulty if the difference is equal to or smaller than the predetermined reference value, it is possible to determine the failure of the temperature sensor correctly, regardless of environmental conditions at the start of the engine. Further, since the determination of failure of the temperature sensor can be carried out at the start of the present operation, the failure determination apparatus according to the first aspect of the present invention is capable of determining the failure of the temperature sensor promptly at the start of the engine, differently from the prior art.

To attain the above object, according to a second aspect of the invention, there is provided a failure determination apparatus for determining failure of a temperature sensor that detects a temperature which changes according to an operating condition of an internal combustion engine.

The failure determination apparatus according to the second aspect of the invention is characterized by comprising:

an operation progress parameter calculation module for calculating an operation progress parameter indicative of a degree of progress of operation of the engine after the engine has started;

a temperature memory module for storing a value of the temperature detected by the temperature sensor when the engine is stopped;

a stop time measurement module for measuring a stop time period from a stoppage to a start of the engine; and a failure determination module for determining that the temperature sensor is faulty, when a difference between a value of the temperature detected by the temperature sensor at the start of the present operation of the engine and the value of the temperature stored by the temperature memory module is equal to or smaller than a predetermined reference value, on condition that the operation progress parameter calculated during an immediately preceding operation of the engine is larger than a predetermined value, and that the stop time period before the start of the present operation of the engine is longer than a predetermined time period.

This failure determination apparatus according to the second aspect of the invention provides the same advantageous effects as described above concerning the failure determination apparatus according to the first aspect of the invention.

To attain the above object, according to a third aspect of the invention, there is provided a failure determination method of determining failure of a temperature sensor that detects a temperature which changes according to an operating condition of an internal combustion engine.

The failure determination method according to the third aspect of the invention is characterized by comprising the steps of:

calculating an operation progress parameter indicative of a degree of progress of operation of the engine after the engine has started;

storing a value of the temperature detected by the temperature sensor when the engine is stopped;

measuring a stop time period from a stoppage to a start of the engine; and determining that the temperature sensor is faulty, when a difference between a value of the temperature detected by the temperature sensor at the start of the present operation of the engine and the stored value of the temperature is equal to or smaller than a predetermined reference value, on condition that the operation progress parameter calculated during an immediately preceding operation of the engine is larger than a predetermined value, and that the stop time period before the start of the present operation of the engine is longer than a predetermined time period.

This failure determination method according to the third aspect of the invention provides the same advantageous effects as described above concerning the failure determination apparatus according to the first aspect of the invention.

To attain the above object, according to a fourth aspect of the invention, there is provided an engine control unit including a control program for causing a computer to determine failure of a temperature sensor that detects a temperature which changes according to an operating condition of an internal combustion engine.

The engine control unit according to the fourth aspect of the invention is characterized in that the control program causes the computer to calculate an operation progress parameter indicative of a degree of progress of operation of the engine after the engine has started, store a value of the temperature detected by the temperature sensor when the engine is stopped in a memory device of the computer, measure a stop time period from a stoppage to a start of the engine, and determine that the temperature sensor is faulty, when a difference between a value of the temperature detected by the temperature sensor at the start of the present operation of the engine and the value of the temperature stored in the memory device is equal to or smaller than a predetermined reference value, on condition that the operation progress parameter calculated during an immediately preceding operation of the engine is larger than a predetermined value, and that the stop time period before the start of the present operation of the engine is longer than a predetermined time period.

This engine control unit according to the fourth aspect of the invention provides the same advantageous effects as described above concerning the failure determination apparatus according to the first aspect of the invention.

In each aspect of the invention, it is preferable that the operation progress parameter is at least one of an integrated value of an operation time period over which the engine has been operated since the start thereof, an integrated value of a travel distance over which a vehicle on which the engine is installed has traveled since the start thereof, and an integrated value of an amount of fuel which has been supplied to the engine since the start thereof.

According to this preferred embodiment of each aspect of the invention, the temperature of the engine generally becomes higher as any of the integrated values of the operation time period, the travel distance, and the amount of fuel supply becomes larger. Therefore, whether or not the temperature of the engine is sufficiently high can be properly determined by using at least one of these integrated values as the operation progress parameter, and hence it is possible to determine the failure of the temperature sensor correctly.

The above and other objects, features, and advantages of the invention will become more apparent from the following detailed description taken in conjunction with the accompanying drawings.

DETAILED DESCRIPTION OF THE PREFERRED EMBODIMENT

Figure 1:
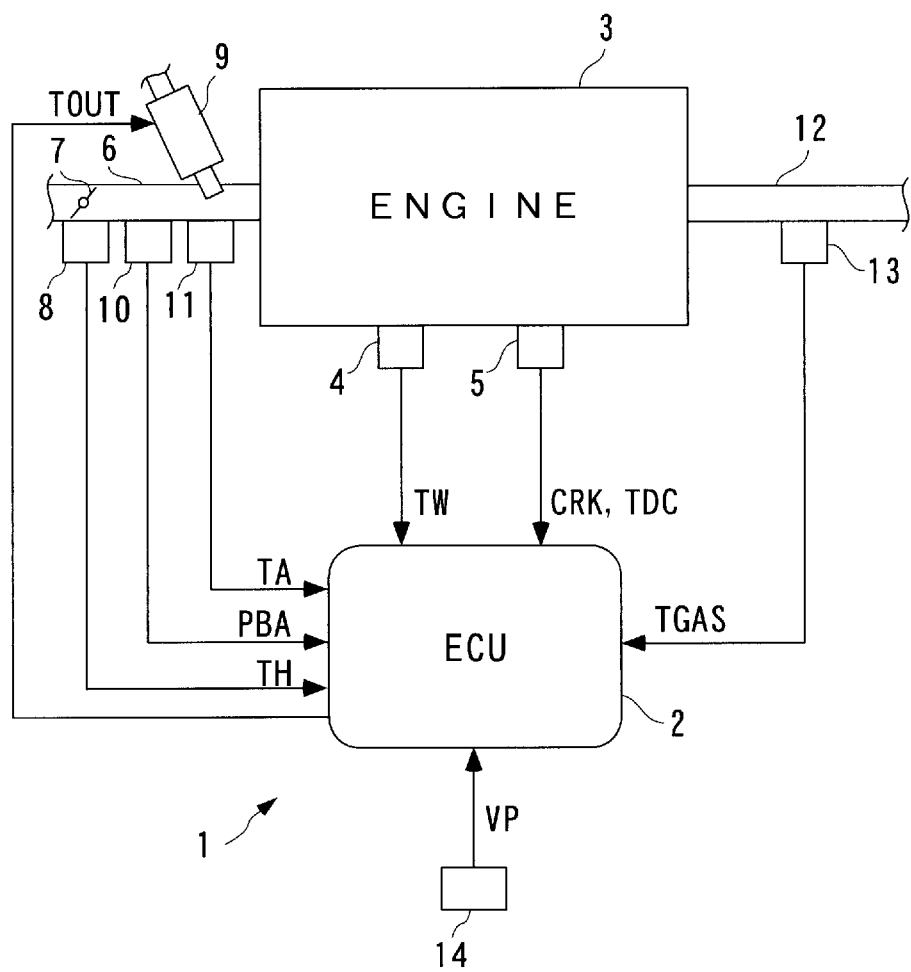
FIG. 1 is a block diagram schematically showing the arrangement of an internal combustion engine incorporating a failure determination apparatus for determining the failure of a temperature sensor, according to an embodiment of the invention.

The invention will now be described in detail with reference to drawings showing an embodiment thereof. Referring first to FIG. 1, there is schematically shown the arrangement of a failure determination apparatus for determining the failure of a temperature sensor, according to the embodiment of the invention. As shown in the figure, this failure determination apparatus 1 includes an ECU 2 (operation progress parameter calculation means, temperature memory means, stop time measurement means, and failure determination means). According to the present embodiment, the failure determination apparatus 1 determines the failure of an engine coolant temperature sensor 4, referred to hereinafter, as a temperature sensor for detecting temperature which changes according to an operating condition of an internal combustion engine (hereinafter simply referred to as "the engine") 3.

The engine 3 is a straight type four-cylinder gasoline engine, for instance. An engine coolant temperature sensor 4 formed of a thermistor or the like is mounted in a cylinder block of the engine 3. The engine coolant temperature sensor 4 senses an engine coolant temperature TW which is the temperature of an engine coolant circulating through the cylinder block of the engine 3, and supplies a signal indicative of the sensed engine coolant temperature TW to the ECU 2. Further, the engine 3 has a crank angle position sensor 5. The crank angle position sensor 5 is a combination of a magnet rotor and an MRE (magnetic resistance element) pickup, and delivers a CRK signal and a TDC signal, both of which are pulse signals, to the ECU 2 whenever a crankshaft, not shown, of the engine 3 rotates through respective predetermined angles. The ECU 2 calculates a rotational speed NE of the engine 3 based on the CRK signal. Each pulse of the TDC signal is generated at a predetermined crank angle position of each cylinder in the vicinity of a top dead center position at the start of an intake stroke of a piston, not shown, in the cylinder whenever the crankshaft rotates through 180 degrees in the case of the four-cylinder gasoline engine.

The engine 3 has an intake pipe 6 having a throttle valve 7 arranged therein. Attached to the throttle valve 7 is a throttle valve opening sensor 8 which detects an opening degree (throttle valve opening) TH of the throttle valve 7 to deliver a signal indicative of the sensed throttle valve opening TH to the ECU 2. The intake pipe 6 has an injector 9, an intake pressure sensor 10, and an intake air temperature sensor 11 inserted therein between the throttle valve 7 and the engine 3. A fuel injection time period TOUT over which the injector 9 injects fuel into the intake pipe 6 is controlled by a drive signal delivered from the ECU 2, whereby the amount of fuel to be supplied to the engine 3 is controlled. On the other hand, the intake pressure sensor 10 senses an absolute pressure (intake pipe absolute pressure) PBA within the intake pipe 6, and delivers a signal indicative of the sensed absolute pressure PBA to the ECU 2. Further, the intake air temperature sensor 11 formed of a thermistor or the like senses an intake air temperature TA within the intake pipe 6, and delivers a signal indicative of the sensed intake air temperature TA to the ECU 2.

Also, the engine 3 has an exhaust pipe 12 having an exhaust temperature sensor 13 inserted therein. The exhaust temperature sensor 13 formed of a thermistor or the like senses a temperature TGAS of exhaust gases within the exhaust pipe 12, and delivers a signal indicative of the sensed temperature TGAS to the ECU 2. On the other hand, a vehicle speed sensor 14 for detecting a traveling speed (vehicle speed) VP of an automotive vehicle on which the engine 3 is installed is electrically connected to the ECU 2, and delivers a signal indicative of the sensed vehicle speed VP to the ECU 2.

The ECU 2 is formed by a microcomputer including an I/O interface, a CPU, a RAM, and a ROM, none of which are shown. The RAM is supplied with power by a backup power source such that data stored therein can be preserved even after the engine 3 is stopped. The signals from the above sensors are each input to the CPU after A/D conversion and waveform shaping by the I/O interface. The CPU determines an operating condition of the engine 3 based on these signals, according to control programs read from the ROM, and the like. The CPU controls the engine 3, and determines a failure of the engine coolant temperature sensor 4 at the same time, based on the determined operating condition.

Figure 2:
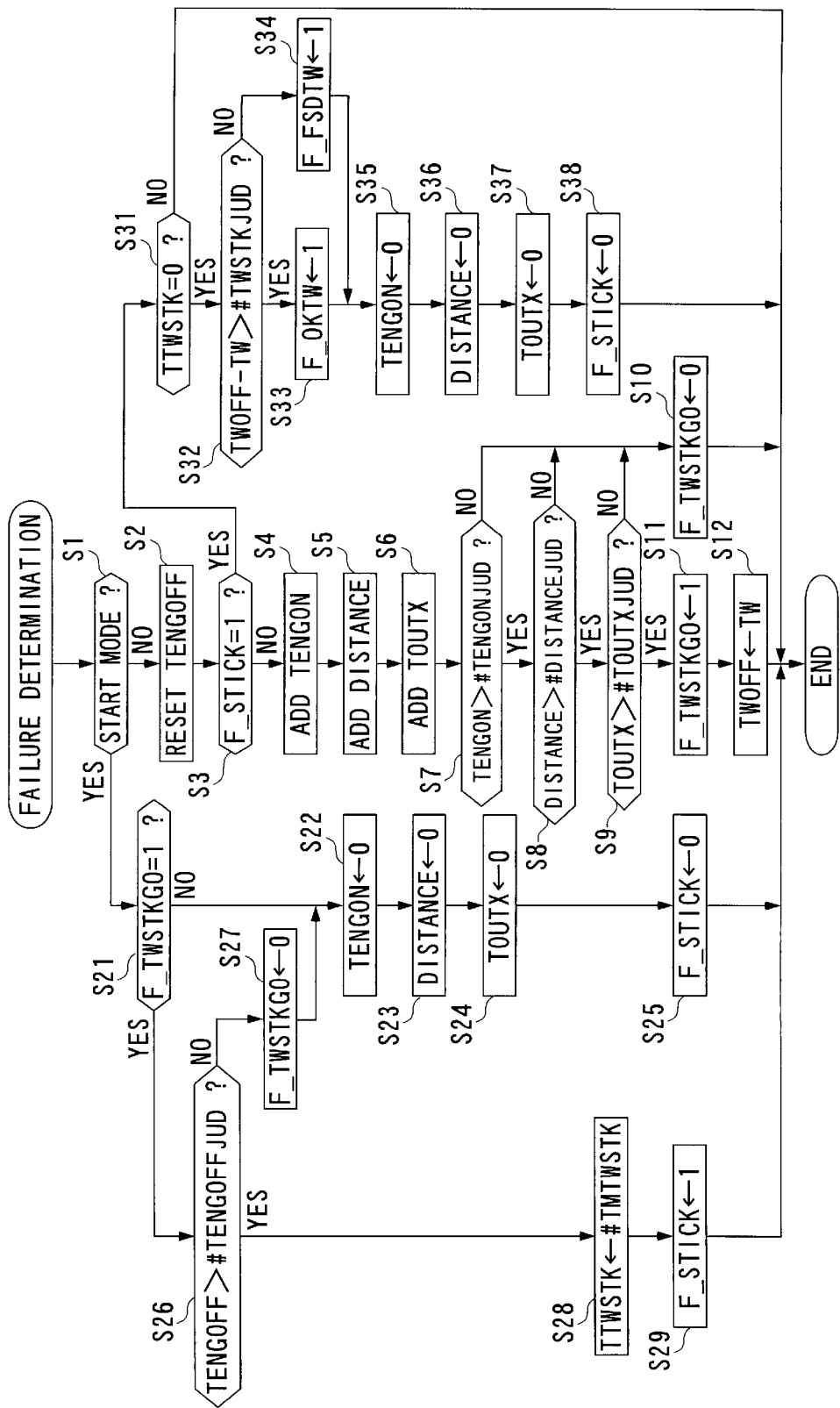
FIG. 2 is a flowchart of a failure determination process carried out by the FIG. 1 failure determination apparatus.

FIG. 2 is a flowchart showing a program for carrying out a failure determination process for determining the failure of the engine coolant temperature sensor 4. This process is carried out e.g. in synchronism with input of the TDC signal from the crank angle position sensor 5 to the ECU 2. In the following, description will be given following a sequence of operations of the engine 3 from a start through a stoppage to a restart thereof, for convenience.

In the process, first, it is determined in a step S1 whether or not the engine 3 is in a start mode, i.e. being started. This determination is performed e.g. based on the engine rotational speed NE, and when the engine rotational speed NE is equal to or lower than a predetermined rotational speed (e.g. 400 rpm) e.g. during cranking of the engine 3, it is determined that the engine 3 is in the start mode.

If the answer to the question of the step S1 is negative (NO), i.e. if the engine 3 has been started and is in a normal operation mode, a count TENGOFF of an engine stop time measurement timer as an upcount timer for measuring a stop time period from a stoppage of the engine 3 to a start of the same is reset in a step S2. It should be noted that the engine stop measurement timer is started when the engine 3 is stopped. Then, in the following step S3, it is determined whether or not a failure determination permission flag F_STICK assumes 1. As described in detail hereinafter, the flag F_STICK is set to 1 when execution conditions for carrying out the failure determination are satisfied.

If the answer to the question of the step S3 is negative (NO), i.e. if the conditions for carrying out the failure determination are not satisfied, respective values of an operation time, a total distance, and a fuel injection time period corresponding to a time period from the immediately preceding execution of the present process to the present execution of the same are added to an operation time integrated value TENGON, a travel distance integrated value DISTANCE, and a fuel injection time integrated value TOUTX (integrated value of the amount of fuel supply), respectively, in respective steps S4, S5 and S6. The integrated values TENGON, DISTANCE and TOUTX are calculated as operation progress parameters indicative of the degree of progress of engine operation after the start of the engine 3. More specifically, the operation time integrated value TENGON is obtained by integrating the time period over which the engine 3 has been operated after the start thereof, while the travel distance integrated value DISTANCE is obtained by integrating the distance over which the engine 3 has traveled after the start thereof, based on the vehicle speed VP detected by the vehicle speed sensor 14. Further, the fuel injection time integrated value TOUTX is obtained by integrating the fuel injection time period TOUT over which fuel has been injected after the start of the engine 3.

Then, based on results of the above arithmetic operations, whether or not the integrated value TENGON is larger than a predetermined reference value #TENGONJUD (e.g. 20 minutes), whether or not the integrated value DISTANCE is larger than a predetermined reference value #DISTANCEJUD (e.g. 5 miles), and whether or not the integrated value TOUTX is larger than a predetermined reference value #TOUTXJUD (e.g. 50 seconds) are determined in respective steps S7, S8 and S9. These determinations are performed so as to determine whether or not the engine coolant temperature TW is sufficiently high due to the sufficient operation of the engine 3.

If the answer to the question of any one of the steps S7, S8 and S9 is negative (NO), i.e. if any one of the integrated values TENGON, DISTANCE and TOUTX is equal to or smaller than the corresponding reference value, there is a possibility that the engine has not been fully operated, and hence the engine coolant temperature TW has not become sufficiently high. Therefore, in this case, since there is a fear that the failure of the engine coolant temperature sensor 4 cannot be determined correctly, it is judged that conditions concerning the operating condition of the engine 3 for execution of the failure determination are not satisfied, and an operating condition satisfaction flag F_TWSTKGO is set to 0 in a step S10, followed by terminating the program. On the other hand, if the answers to the questions of the steps S7, S8 and S9 are all affirmative (YES), i.e. if each of the integrated values TENGON, DISTANCE and TOUTX is larger than the corresponding reference value, it is judged that the engine has been fully operated, and hence the engine coolant temperature TW has become sufficiently high to ensure correct determination of the failure of the engine coolant temperature sensor 4, so that the operating condition satisfaction flag F_TWSTKGO is set to 1 in a step S11. Then, in a step S12, an engine stop time coolant temperature TWOFF is set to a value of the engine coolant temperature TW sensed at this time by the engine coolant temperature sensor 4, followed by terminating the program.

The above steps S1 to S12 are repeatedly carried out from a time point the engine 3 has been started to a time point the same is stopped. It should be noted that the values of the operating condition satisfaction flag F_TWSTKGO and the engine stop time coolant temperature TWOFF are stored as data in the backup RAM of the ECU 2 and preserved even after the engine 3 is stopped.

Then, when the engine 3 is started again after the stoppage, the answer to the question of the step S1 becomes affirmative (YES), so that the program proceeds to a step S21, wherein it is determined whether or not the operating condition satisfaction flag F_TWSTKGO set in the step S10 or S11 assumes 1. If the answer to the question is negative (NO), i.e. if F_TWSTKGO=0 holds, which means the conditions concerning the operating condition of the engine 3 for execution of the failure determination are not satisfied, the integrated values TENGON, DISTANCE and TOUTX are set to a value of 0 for initialization in respective steps S22, S23 and S24 in preparation for the arithmetic operations to be carried out in the steps S4 to S6 for calculating the operation progress parameters after completion of the engine start and for determinations of the operating condition of the engine 3 to be carried out based on the calculated operation progress parameters in the steps S7 to S9. Then, it is judged that the failure determination for the engine coolant temperature sensor 4 should not be performed, and the failure determination permission flag F_STICK is set to 0 in a step S25, followed by terminating the program.

On the other hand, if the answer to the question of the step S21 is affirmative (YES), i.e. if F_TWSTKGO=1 holds, which means the conditions concerning the operating condition of the engine 3 for execution of the failure determination are satisfied, the program proceeds to a step S26, wherein it is determined whether or not the count TENGOFF of the engine stop time measurement timer exceeds a predetermined time period #TENGOFFJUD (e.g. 8 hours). More specifically, in this step, it is determined whether or not the engine stop time period from a stoppage of the immediately preceding operation of the engine 3 to a state of the present operation of the same is longer than the predetermined time period. If the answer to the question is negative (NO), i.e. if TENGOFF≦#TENGOFFJUD holds, it is judged that the engine stop time period is too short for the engine coolant temperature TW to become sufficiently low, and hence there is a fear that the determination of failure of the engine coolant temperature sensor 4 cannot be performed correctly, so that the operating condition satisfaction flag F_TWSTKGO is set to 0 in a step S27. Then, the steps S22 to S25 are executed, followed by terminating the program. It should be noted that when the flag F_TWSTKGO is set to 0 in the step S27, the answer to the question of the step S21 is always negative (NO) during the engine start from then on, so that the steps S22 to S25 are repeatedly executed until the completion of the start of the engine 3.

If the answer to the question of the step S26 is affirmative (YES), i.e. if the engine stop time period is longer than the predetermined time period #TENGOFFJUD, it is judged that the engine stop time period is sufficiently long and the engine coolant temperature TW has become low enough for execution of correct failure determination for the engine coolant temperature sensor 4, a count TTWSTK of a failure determination delay timer as a downcount timer is set to a predetermined time period #TMTWSTK (e.g. 1 second) and started in a step S28, and the failure determination permission flag F_STICK is set to 1 in a step S29, followed by terminating the program.

Thereafter, when the start of the engine is completed, the answer to the question of the step S1 becomes negative (NO), and the steps S2 et seq. are executed. More specifically, if the failure determination permission flag F_STICK was set to 0 during the engine start (step S25), the answer to the question of the step S3 becomes negative (NO) as described above, so that the arithmetic operations for calculating the operation time integrated value TENGON, the travel distance integrated value DISTANCE, and so forth initialized in the steps S22 to S24 are carried out from the beginning at the respective steps S4 to S6, and then determinations as to the conditions concerning the operating condition of the engine are carried out in the steps S7 to S9, based on the calculated integrated values, as described above.

On the other hand, if the answer to the question of the step S3 is affirmative (YES), i.e. if the failure determination permission flag F_STICK was set to 1 in the step S29, which means the execution conditions for the failure determination are satisfied, the program proceeds to a step S31. In the step S31, it is determined whether or not the count TTWSTK of the failure determination delay timer started in the step S28 is equal to 0. If the answer to the question of the step S31 is negative (NO), the program is terminated immediately, whereas if the answer is affirmative (YES), i.e. if the predetermined time period #TMTWSTK has elapsed after the start of the engine 3, it is judged that the start of the engine 3 has been positively completed, and the program proceeds to a step S32.

In the step S32, it is determined whether or not the difference (TWOFF−TW) between the engine stop time coolant temperature TWOFF detected at the end of the immediately preceding engine operation and the engine coolant temperature TW detected at this time in the present engine operation is larger than a predetermined reference value #TWSTKJUD (e.g. 3° C.). If the answer to the question is affirmative (YES), i.e. if the difference (TWOFF−TW) is larger than the predetermined reference value #TWSTKJUD, it is judged from the sufficiently large difference that the engine coolant temperature sensor 4 is normal, and an engine coolant temperature sensor normality flag F_OKTW is set to 1 in a step S33. On the other hand, if the answer to the question of the step S32 is negative (NO), i.e. if the difference (TWOFF−TW) is equal to or smaller than the predetermined reference value #TWSTKJUD, since the difference should have become larger in a normal state, it is judged that the engine coolant temperature sensor 4 is faulty, and an engine coolant temperature sensor failure flag F_FSDTW is set to 1 in a step S34.

After execution of the step S33 or S34, the operation time integrated value TENGON, the travel distance integrated value DISTANCE, and the fuel injection time integrated value TOUTX are initialized to a value of 0 in respective steps S35, S36 and S37, and then in the step S38, the failure determination permission flag F_STICK is set to 0 so as to indicate termination of the failure determination for the engine coolant temperature sensor 4, followed by terminating the program. Since the flag F_STICK is set to 0 in the step S38 after termination of the failure determination as described above, the failure determination is not executed from then on during the present engine operation. In other words, the failure determination is executed only once for each engine operation. In the following loop et seq., the answer to the question of the step S3 is negative (NO), and hence, in preparation for failure determination to be executed next time, the arithmetic operations for calculating the operation time integrated value TENGON, the travel distance integrated value DISTANCE, and so forth are carried out in the respective steps S4 to S6, and then determinations of satisfaction of the conditions concerning the operating condition of the engine 3 are carried out in the steps S7 to S9, based on the calculated integrated values.

If it is determined that the engine coolant temperature sensor 4 is faulty, an alarm lamp, not shown, arranged on an instrument panel, not shown, is lit to inform the driver of the fact, and at the same time, fail-safe processing is carried out.

As described in detail heretofore, according to the failure determination apparatus of the present embodiment, on condition that the engine coolant temperature TW became sufficiently high by full operation of the engine 3 in the immediately preceding operation, and that the engine coolant temperature TW has become sufficiently low due to an adequately long stoppage of the engine 3 after the immediately preceding operation, the failure determination for the engine coolant temperature sensor 4 is executed based on the difference between a value TW of the engine coolant temperature detected at the start of the present engine operation and a value TWOFF of the engine coolant temperature detected at the end of the immediately preceding engine operation, so that the failure of the engine coolant temperature sensor 4 can be determined correctly, regardless of environmental conditions at the start of the engine 3. Further, since the failure determination is carried out at the start of the present engine operation, differently from the prior art, the apparatus of the present embodiment is capable of determining the failure of the engine coolant temperature sensor 4 promptly at the start of the engine.

It should be noted that the present invention is not necessarily limited to the above embodiment, but it can be put into practice in various forms. For instance, although in the above embodiment, determination as to whether or not the engine coolant temperature TW has become sufficiently high after full operation of the engine 3 in the immediately preceding operation is performed on condition that the operation time integrated value TENGON, the travel distance integrated value DISTANCE, and the fuel injection time integrated value TOUTX are all larger than the respective reference values, this is not limitative, but it is possible to carry out the determination on condition that any one of the integrated values TENGON, DISTANCE and TOUTX is larger than the corresponding reference value. Moreover, any suitable parameter other than the integrated values TENGON, DISTANCE and TOUTX can be employed as an operation progress parameter indicative of the degree of progress of engine operation.

Further, although in the present embodiment, the failure determination is carried out for the engine coolant temperature sensor 4, the failure determination apparatus of the invention can also be applied to failure determination for other temperature sensors, such as the intake air temperature sensor 11, the exhaust temperature sensor 13, and a lubricating oil temperature sensor, not shown, each of which detects a temperature which changes according to the operating condition of the engine 3.

It is further understood by those skilled in the art that the foregoing is a preferred embodiment of the invention, and that various changes and modifications may be made without departing from the spirit and scope thereof.

What is claimed is:

1. A failure determination apparatus for determining failure of a temperature sensor that detects a temperature which changes according to an operating condition of an internal combustion engine, the failure determination apparatus comprising:
  operation progress parameter calculation means for calculating an operation progress parameter indicative of a degree of progress of operation of the engine after the engine has started;

temperature memory means for storing a value of the temperature detected by the temperature sensor when the engine is stopped;

stop time measurement means for measuring a stop time period from a stoppage to a start of the engine; and failure determination means for determining that the temperature sensor is faulty, when a difference between a value of the temperature detected by the temperature sensor at the start of the present operation of the engine and the value of the temperature stored in said temperature memory means is equal to or smaller than a predetermined reference value, on condition that the operation progress parameter calculated during an immediately preceding operation of the engine is larger than a predetermined value, and that the stop time period before the start of the present operation of the engine is longer than a predetermined time period.

2. A failure determination apparatus according to claim 1, wherein the operation progress parameter is at least one of an integrated value of an operation time period over which the engine has been operated since the start thereof, an integrated value of a travel distance over which a vehicle on which the engine is installed has traveled since the start thereof, and an integrated value of an amount of fuel which has been supplied to the engine since the start thereof.

3. A failure determination apparatus for determining failure of a temperature sensor that detects a temperature which changes according to an operating condition of an internal combustion engine, the failure determination apparatus comprising:

an operation progress parameter calculation module for calculating an operation progress parameter indicative of a degree of progress of operation of the engine after the engine has started;

a temperature memory module for storing a value of the temperature detected by the temperature sensor when the engine is stopped;

a stop time measurement module for measuring a stop time period from a stoppage to a start of the engine; and a failure determination module for determining that the temperature sensor is faulty, when a difference between a value of the temperature detected by the temperature sensor at the start of the present operation of the engine and the value of the temperature stored in said temperature memory module is equal to or smaller than a predetermined reference value, on condition that the operation progress parameter calculated during an immediately preceding operation of the engine is larger than a predetermined value, and that the stop time period before the start of the present operation of the engine is longer than a predetermined time period.

4. A failure determination apparatus according to claim 3, wherein the operation progress parameter is at least one of an integrated value of an operation time period over which the engine has been operated since the start thereof, an integrated value of a travel distance over which a vehicle on which the engine is installed has traveled since the start thereof, and an integrated value of an amount of fuel which has been supplied to the engine since the start thereof.

5. An engine control unit including a control program for causing a computer to determine failure of a temperature sensor that detects a temperature which changes according to an operating condition of an internal combustion engine, wherein the control program causes the computer to calculate an operation progress parameter indicative of a degree of progress of operation of the engine after the engine has started, store a value of the temperature detected by the temperature sensor when the engine is stopped in a memory device of the computer, measure a stop time period from a stoppage to a start of the engine, and determine that the temperature sensor is faulty, when a difference between a value of the temperature detected by the temperature sensor at the start of the present operation of the engine and the value of the temperature stored in the memory device is equal to or smaller than a predetermined reference value, on condition that the operation progress parameter calculated during an immediately preceding operation of the engine is larger than a predetermined value, and that the stop time period before the start of the present operation of the engine is longer than a predetermined time period.

6. An engine control unit according to claim 5, wherein the operation progress parameter is at least one of an integrated value of an operation time period over which the engine has been operated since the start thereof, an integrated value of a travel distance over which a vehicle on which the engine is installed has traveled since the start thereof, and an integrated value of an amount of fuel which has been supplied to the engine since the start thereof.

7. A failure determination method of determining failure of a temperature sensor that detects a temperature which changes according to an operating condition of an internal combustion engine, the failure determination method comprising the steps of:

calculating an operation progress parameter indicative of a degree of progress of operation of the engine after the engine has started;

storing a value of the temperature detected by the temperature sensor when the engine is stopped;

measuring a stop time period from a stoppage to a start of the engine; and determining that the temperature sensor is faulty, when a difference between a value of the temperature detected by the temperature sensor at the start of the present operation of the engine and the stored value of the temperature is equal to or smaller than a predetermined reference value, on condition that the operation progress parameter calculated during an immediately preceding operation of the engine is larger than a predetermined value, and that the stop time period before the start of the present operation of the engine is longer than a predetermined time period.

8. A failure determination method according to claim 7, wherein the operation progress parameter is at least one of an integrated value of an operation time period over which the engine has been operated since the start thereof, an integrated value of a travel distance over which a vehicle on which the engine is installed has traveled since the start thereof, and an integrated value of an amount of fuel which has been supplied to the engine since the start thereof.

* * * * *